US009489771B2

United States Patent
Gierach et al.

(10) Patent No.: US 9,489,771 B2
(45) Date of Patent: Nov. 8, 2016

(54) TECHNIQUES FOR SPATIALLY SORTING GRAPHICS INFORMATION

(71) Applicant: Intel Corporation, Santa Clara, CA (US)

(72) Inventors: John G. Gierach, Hillsboro, OR (US); Travis T. Schluessler, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 340 days.

(21) Appl. No.: 13/938,192

(22) Filed: Jul. 9, 2013

(65) Prior Publication Data

US 2015/0015575 A1    Jan. 15, 2015

(51) Int. Cl.
*G06T 17/20* (2006.01)
*G06T 15/40* (2011.01)

(52) U.S. Cl.
CPC .............. *G06T 17/20* (2013.01); *G06T 15/40* (2013.01)

(58) Field of Classification Search
None
See application file for complete search history.

(56) References Cited

U.S. PATENT DOCUMENTS

| 5,831,628 A | 11/1998 | Shimizu |
| 2005/0195197 A1* | 9/2005 | Wolfe ............................ 345/505 |
| 2014/0267377 A1* | 9/2014 | Halstvedt et al. ............ 345/613 |
| 2014/0292756 A1* | 10/2014 | Mantor et al. ................ 345/426 |

OTHER PUBLICATIONS

Green et al.; Barron's CHSPE: California High School Proficiency Exam; Barron's Educational Series; 7th edition (Sep. 1, 2007); pp. 97 and 98.*
Purdue OWL; Purdue OWL: Gerunds, Participles and Infinitives; Infinitives; https://owl.english.purdue.edu/owl/resource/627/03/; retrieved Feb. 13, 2016.*
Gambrill; Sentence Fragments; San Jose State University Writing Center; http://www.sjsu.edu/writingcenter/docs/Sentence_Fragments_Handout_FINAL.pdf; retrieved Feb. 13, 2016.*
Intel Corporation (2012), "DirectX* Developer's Guide for Intel® Processor Graphics, Maximizing Performance on the New Intel Microarchitecture Codenamed Ivy Bridge", 23 pages.
Office Action received for Canadian Patent Application No. 2,855,429, mailed Jan. 15, 2016, 6 pages.

* cited by examiner

*Primary Examiner* — Carlos Perromat

(57) ABSTRACT

Various embodiments are generally directed to an apparatus, method and other techniques for separating a group of polygons from a viewpoint of a scene into a dependent subgroup of polygons or a non-dependent subgroup of polygon and spatially sorting the non-dependent subgroup of polygons and the dependent group of polygons separately to form a sorted group of polygons.

24 Claims, 10 Drawing Sheets

600

- ASSIGN POLYGONS OF A GROUP OF POLYGONS FROM A VIEWPOINT OF A SCENE INTO A DEPENDENT SUBGROUP OR A NON-DEPENDENT SUBGROUP BASED ON A DEPENDENCY INDICATOR
  *605*

- SPATIALLY SORT POLYGONS IN THE NON-DEPENDENT SUBGROUP TO FORM A FIRST PARTIALLY SORTED GROUP OF POLYGONS
  *610*

- SPATIALLY SORT POLYGONS IN THE DEPENDENT SUBGROUP TO FORM A SECOND PARTIALLY SORTED GROUP OF POLYGONS
  *615*

- ADDING POLYGONS FROM THE SECOND GROUP OF POLYGONS TO THE FIRST GROUP OF POLYGONS TO FORM A COMPLETE SORTED GROUP OF POLYGONS
  *620*

*FIG. 6*

TECHNIQUES FOR SPATIALLY SORTING GRAPHICS INFORMATION

TECHNICAL FIELD

Embodiments described herein generally relate to spatially sorting graphics information for processing by a graphics processing unit (GPU). In particular, embodiments are directed to spatially sorting overlapping polygons that are not rendered consecutively.

BACKGROUND

In three-dimensional (3-D) graphics, objects are represented using a number of techniques such as polygon mesh, modeling, etc. Among these techniques, polygon mesh representation is popular. In polygon mesh representation, an object is represented by a mesh of polygonal facets. In the general case, an object has curved surfaces and the facets are an approximation to such a surface. A polygon mesh representation is a geometric and topological description of the boundary or surface of the object.

In a typical graphics processing system polygons are used to create 3-D objects for displaying on a two-dimensional (2-D) surface such as a display. Because polygons are flat surfaces, they can only estimate curved shapes, which many objects have. Therefore, smaller polygons can more accurately represent curved objects and using smaller polygons also means more polygons are required to create the object. As a result, the more polygons that a 3-D model includes, the more smooth and realistic it will appear when displayed on the display. In some instances a scene for an application may contain more than one polygon mesh including millions of polygons to create various objects for the scene. These polygons may overlap each other from a viewpoint perspective used to display the scene on a 2-D display. When meshes are processed by a graphics processing unit (GPU) or system, they are rendered one polygon at a time. To render the polygons for polygon meshes one at a time, an order must be established. However, under certain circumstances, processing of the polygons can become stalled when overlapping polygons are processed consecutively or nearly consecutively in the order causing a performance penalty.

BRIEF DESCRIPTION OF THE DRAWINGS

FIG. 6 illustrates an embodiment of a second logic flow diagram.

DETAILED DESCRIPTION

Figure 1:
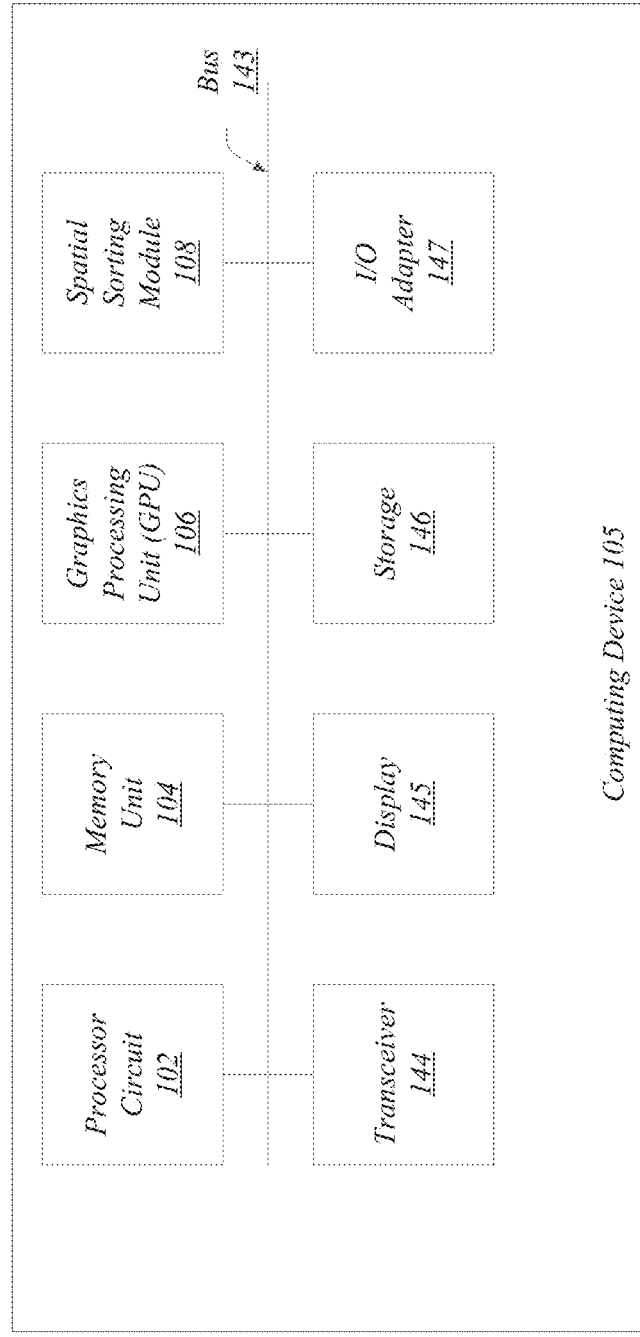
FIG. 1 illustrates an embodiment of a first computing system.

Various embodiments are generally directed to an apparatus, system and method for spatially sorting a plurality of polygons for a scene for rendering by a graphics processing unit (GPU). As previously discussed, polygons are used to create 3-D objects for displaying on a 2-D surface. Triangles are the most common polygon used to create 3-D meshes of the objects, however, the polygon can also be rectangles, hexagons, or other shapes. Colors and textures can be mapped onto these polygons, giving the final image a realistic appearance.

As previously discussed, a scene may have many objects or polygon meshes, each having polygons. Thanks to advances in graphics processing technology, today's video cards can render millions of polygons per second. This allows for many highly detailed 3-D objects to be displayed on a display at one time. However, when rendering a scene including one or more objects made of thousands or millions of polygons, some polygons are inevitably going to overlap other polygons in the scene from the perspective of a viewpoint for the scene. For example, a scene depicting a field will have millions of polygons to create objects such as grass, trees, and any other objects that may be in a scene. Some of the polygons to create these objects will overlap and/or intersect other polygons.

Typically, polygons are sorted from either front to back from a viewpoint or to avoid overdraw of opaque polygons or back to front from the viewpoint to render objects with transparency correctly. However, under certain circumstances, rendering polygons in this order can stall processing when consecutively or near consecutively overlapping polygons are rendered. These stalls are caused by serialized accesses to graphics information that may be enforced due to multiple hardware execution contexts simultaneously accessing the graphics information. If an application and the scene being rendered are at least partially GPU bound and stalls occur, the application can sustain a substantial performance penalty.

In various embodiments, a spatial sorting technique may be applied to polygons for a scene to avoid rendering stalls and performance penalties. In particular, the graphics information can be spatially sorted before it is rendered by the GPU. The graphics information may include data for each polygon such as vertices and end points used to create the polygon. The graphics information may also include color, hue, and texture data for each of the polygons. The graphics information may be spatially sorted in a same relative order (front to back or back to front) but avoids rendering consecutive or near consecutive overlapping polygons at the same time. By separating overlapping polygons from one another, these overlapping polygons will be scheduled independently of one another in time. Further, the spatial sorting technique avoids the problem of serialized accesses to related graphics information by multiple hardware execution contexts because the overlapping polygons are not processed on multiple hardware contexts at the same time. In some embodiments, performance gains of 15% or more may be realized when spatial sorting is applied to the polygons compared to a front to back sort or back to front sort. These and other details will become more apparent in the following discussion below.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of a system 100 and computing device 105. In various embodiments, system 100 may be representative of a system or architecture suitable for use with one or more embodiments described herein, such as logic flows 200 of FIG. 2, and/or logic flow 600 of FIG. 6. The embodiments are not limited in this respect.

As shown in FIG. 1, system 100 may include multiple elements. One or more elements may be implemented using one or more circuits, components, registers, processors, software subroutines, modules, or any combination thereof, as desired for a given set of design or performance constraints. Although FIG. 1 shows a limited number of elements in a certain topology by way of example, it can be appreciated that more or less elements in any suitable topology may be used in system 100 as desired for a given implementation. The embodiments are not limited in this context.

In various embodiments, system 100 may include a computing device 105 which may be any type of computer or processing device including a server, server farm, blade server, or any other type of server, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various embodiments, computing device 105 may include processor circuit 102. Processor circuit 102 may be implemented using any processor or logic device. The processing circuit 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuitry on a single chip or integrated circuit. The processing circuit 102 may be connected to and communicate with the other elements of the computing system via an interconnect 143, such as one or more buses, control lines, and data lines.

In one embodiment, computing device 105 may include a memory unit 104 to couple to processor circuit 102. Memory unit 104 may be coupled to processor circuit 102 and graphics processing unit (GPU) 106 via communications bus 143, or by a dedicated communications bus between processor circuit 102 and memory unit 104, as desired for a given implementation. In some embodiments, memory unit 104 may be shared with the GPU 106 and/or any other device of computer system 105. In some embodiments, memory unit 104 may include memory cache hierarchies that reside in processing circuit 102 and GPU 106, or on a system level. These cache hierarchies may be part of a shared computer system resource. Memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 105 may include a graphics processing unit (GPU) 106, in various embodiments. The GPU 106 may include any processing unit, logic or circuitry optimized to perform graphics-related operations as well as the video decoder engines and the frame correlation engines. The GPU 106 may be used to render two-dimensional (2-D) and/or three-dimensional (3-D) images for various applications such as video games, graphics, computer-aided design (CAD), simulation and visualization tools, imaging, etc. Various embodiments are not limited in this manner; GPU 106 may process any type of graphics data such as pictures, videos, programs, animation, 3-D, 2-D, objects images and so forth.

In some embodiments, computing device 105 may include a spatial sorting module 108 for spatially sorting graphics information. The spatial sorting module 108 may be implemented in any hardware, such the graphics processing unit (GPU) 106 and/or the processing circuit 102, or in any software such as a software driver, or combination thereof. In various embodiments, spatial sorting module 108 may include logic or instructions to process logic flow 200 of FIG. 2 and logic flow 600 of FIG. 6.

For example and in various embodiments, the spatial sorting module 108 may generate a group of polygons for one or more polygon meshes including graphics information. The graphics information may be a collection of vertices, edges and faces that defines a shape of one or more objects for a scene f. The graphics information may also include information for color, hue and texture for the polygons. The graphics information may include information from a vertex buffer and index buffer and view frustum information. The spatial sorting module 108 may divide or separate the group of polygons for the scene into a dependent group of polygons and a non-dependent group of polygons based on overlapping information. The overlapping information may be one or more dependency indicators marked or tagged on a polygon identifying that the polygon either overlaps other polygons or that the polygon is overlapped by other polygons. Each polygon may have any number of dependency indicators based on the number of overlapping or overlapped polygons and for each polygon overlapped or overlapping. Polygons from the group of polygons may be separated into dependent subgroup of polygons if they are marked or tagged with a dependency indicator. In addition, the polygons that are not marked or tagged with dependency indicator may be separated or divided into a non-dependent subgroup of polygons.

In some embodiments, polygons in each of the subgroups, dependent and non-dependent, may be separately spatially sorted to create a sorted group of polygons for processing by a processing circuit or a graphics processing unit (GPU). The polygons may be spatially sorted using any number of spatially sorting techniques, such as from left-to-right, right-to-left, sorting based on sections of a 2-D screen space, sorting based on a maximum distance between each of the polygons in the 2-D screen space, and/or sorting based on a maximum distance between polygons in sections of the 2-D screen space.

In some embodiments, the non-dependent subgroup of polygons may be spatially sorted based on one of the techniques described herein and then polygons in the dependent subgroup of polygons associated with polygons in the non-dependent subgroup of polygons may have their dependency indicators removed. At this point, the polygons in the dependent subgroup of polygons without dependency indicators may be spatially sorted. The polygons in the dependent group of polygons may be spatially sorted by being removed from the dependent subgroup of polygons and added to a new non-dependent subgroup of polygons. The polygons without dependency indicators may be removed from the dependent subgroup of polygons and added to a new non-dependent subgroup of polygons. The new non-dependent subgroup of polygons may be spatially sorted and added after the last polygon in the sorted non-dependent subgroup of polygons.

In some embodiments, polygons in the dependent subgroup of polygons may have one or more dependency indicators associated with other one or more polygons in the dependent subgroup of polygons. Thus, the dependency indicator may not be removed until all of the dependency indicators on the "parent" polygon has its dependency indicators removed, is spatially sorted and is added to the sorted group of polygons.

The spatial sorting module 108 may create an empty sorted list to store sorted polygons from the subgroups of polygons for rendering by the GPU 106. Polygons may be added to the sorted list of polygons as they are sorted and include the polygons from the sorted group of polygons. The sorted list of polygons may then be used to create a new index buffer to process the graphics information by a GPU 106.

In some embodiments, the spatial sorting module 108 may adjust a viewpoint such that all of the polygons of the scene are in the view frustum. The viewpoint is the point from which a user of the computing device sees the scene displayed on a display. The viewpoint may be adjusted by moving along a forward axis such that all of the polygons are in view. The spatial sorting module 108 may analyze one or more polygons to determine if the one or more polygons overlap one or more other polygons in the scene from the new viewpoint. Overlapping polygons may occur when one polygon is in front one or more other polygon as shown in the 2-D scene from the perspective of the viewpoint. Thus, if these polygons and graphics information are render in a front to back or back to front order overlapping polygons may be rendered consecutively.

Moreover, a special case of overlapping occurs when one or more polygons intersect one or more other polygons. For example, a portion of one polygon may go through a portion of another polygon in the scene. One example would be a knife cutting into another object such as a piece of paper or a box. As discussed in more detail below, this special case of overlapping may be handled differently than a normal overlapping of polygons.

In various embodiments, the spatial sorting module 108 may determine if spatial sorting is transparent polygons for one or more transparent polygon meshes or opaque polygons for one or more opaque polygon meshes. If the spatial sorting is for a transparent mesh, the polygons overlapping other polygons are marked or tagged with a dependency indicator. The dependency indicator is added to the polygon to indicate that the polygon has a dependent polygon associated with it. For the case where a polygon intersects another polygon, the polygon with a vertex having the closest distance to the viewpoint is marked or tagged with the dependency indicator.

In various embodiments, if the spatial sorting is for an opaque mesh, the polygon being overlapped by another is marked or tagged with a dependency indicator by the spatial sorting module 108. For the case where a polygon intersects another polygon, the polygon having a vertex with the furthest distance from the viewpoint is marked or tagged with the dependency indicator.

The spatial sorting module 108 may create a non-dependent subgroup of the group of polygons including all of the polygons that are not marked or tagged with a dependency indicator, as described above. In addition, the spatial sorting module may create the dependent subgroup of polygons including all the polygons marked or tagged with a dependency indicator. The non-dependent subgroup of polygons may then be spatially sorted based on a number of spatial sorting techniques and to avoid re-sorting when the frustum or viewpoint slightly changes for the scene.

In various embodiments, the non-dependent subgroup of polygons is added or appended to the sorted list of polygons previously created on a per polygon basis. If the non-dependent subgroup of polygons is spatially sorted, the polygons may be added or appended to the sorted list of polygons in the order they were spatially sorted in. For example, if the subgroups of polygons were spatially sorted in order based on a maximum distance between each of the polygons, the subgroups of polygons may be added or appended to the sorted listed of polygons in the order in which they were sorted to create the sorted group of polygons.

In some embodiments, the polygons may be spatially sorted in a left to right order (−x to +x value) or a right to left order (+x to −x value) in the 2-D screen space, where 0 is the middle of the 2-D screen space. Thus, in this case, the subgroups of polygons spatially sorted may be added or appended to the sorted list of polygons in a staggered order to ensure nearly overlapping polygons are not rendered consecutively. For example, a polygon at the −x value (furthest left) may be added or appended to the sorted list of polygons and then the polygon at the +x value (furthest right) may be added next and then the next furthest left polygon may be added and so on until all the polygons in the non-dependent subgroup of polygons are added or appended to the sorted list in this staggered fashion. In another example, the 2-D screen space may be divided into three sections, left, right and middle. In this example, the polygons may be added to the sorted list of polygons based on the location of the polygon in one of these sections in a left, right and middle order, or a right, left and middle order. This process would be repeated until all of the polygons in the non-dependent subgroup of polygons are in the sorted list of polygons. In a third example, the 2-D screen space may be divided into four sections, left, middle left, middle right and right. In this example, the polygons in the sections may be added or appended in a left, middle right, middle left and then right order, and repeated until all the polygons are in the sorted list of polygons. Various embodiments are not limited to these examples and the 2-D screen space may be divided into any number of sections and the polygons may be added or appended in any order to ensure that overlapping polygons are not consecutively processed. The above-discussed process may be applied to polygons from the non-dependent subgroup of polygons and the dependent subgroup of polygons.

In one or more embodiments, the polygons are removed from the non-dependent subgroup of polygons and the dependent subgroup of polygons as they are added or appended to the sorted list of polygons until all the polygons in the non-dependent subgroup of polygons are removed. The spatial sorting module 108 may remove the dependency indicators from all the polygons in the dependent subgroup of polygons associated with the polygons added to the sorted list of polygons. In some embodiments, the polygons previously having dependency indicators are processed by repeating the steps of adding them to a new subgroup of non-dependent polygons (if all of their dependency indicators have been removed), spatially sorting them and/or adding them to the sorted list of polygons. In some embodiments, the polygons may not have to be added to a new subgroup of non-dependent polygons before they are spatially sorted. This process may be repeated until all of the polygons in the group of polygons are in the sorted list of polygons.

The spatial sorting module 108 may apply the spatial sorting technique to other processing contexts such as processing function calls where multiple function calls may call the same function or memory accesses where the contents of a memory location may be accessed at the same time.

For example, function calls to the same processing thread may occur at the same time creating a stall where one call has to wait for another call to finish processing before the call may access the same processing thread. Thus, the one or more function calls may overlap or depend on one or more other function calls in time. The function calls that are overlapped (or occur second in time) by one or more function calls may be marked or tagged with a dependency indicator such that they are not processed consecutively with their overlapping function call. As similarly discussed above, the one or more function calls not tagged or marked with a dependency indicator may be divided into a subgroup of non-dependent function calls. These function calls in the subgroup may then be spatially sorted and/or put into a sorted processing list in a staggered order to ensure that non-dependent and their associated dependent function calls are separated by a maximum temporally boundary when processed. The dependency indicators may then be removed from the dependent function calls associated with the function calls in the sorted list of function calls and then may be added or appended to the sorted list of function calls for processing by one or more processing circuits. By ensuring that dependent function calls are not processed consecutively or simultaneously processing stalls may be eliminated or reduced.

In another example, memory accesses may be spatially sorted such that memory accesses trying to access the same data in a memory location do not occur consecutively or simultaneously in a multi-threaded and/or multi-core environment. As similarly discussed above, memory access commands may be analyzed to determine if one or more memory accesses overlap one or more other memory accesses in time initiated from multiple threads. The memory access to occur second in time may be marked with a dependency indicator. The one or more memory accesses not having a dependency indicator may then be divided into a subgroup of non-dependent memory accesses and spatially sorted temporally such that memory accesses with the furthest distance in time may be ordered to occur consecutively or simultaneously. Then the dependency indicators may be removed from the memory accesses associated with memory accesses added to the sorted list of memory accesses and are also added or appended to the sorted list of memory accesses by repeating the process as described above.

In various embodiments, system 100 may include a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

In various embodiments, computing device 105 may include a display 145. Display 145 may constitute any display device capable of displaying information received from processor circuit 102 and/or graphics processing unit 106.

In various embodiments, computing device 105 may include storage 146. Storage 146 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 1046 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 105 may include one or more I/O adapters 147. Examples of I/O adapters 147 may include Universal Serial Bus (USB) ports/adapters, IEEE 1394 Firewire ports/adapters, and so forth. The embodiments are not limited in this context.

Figure 2A:
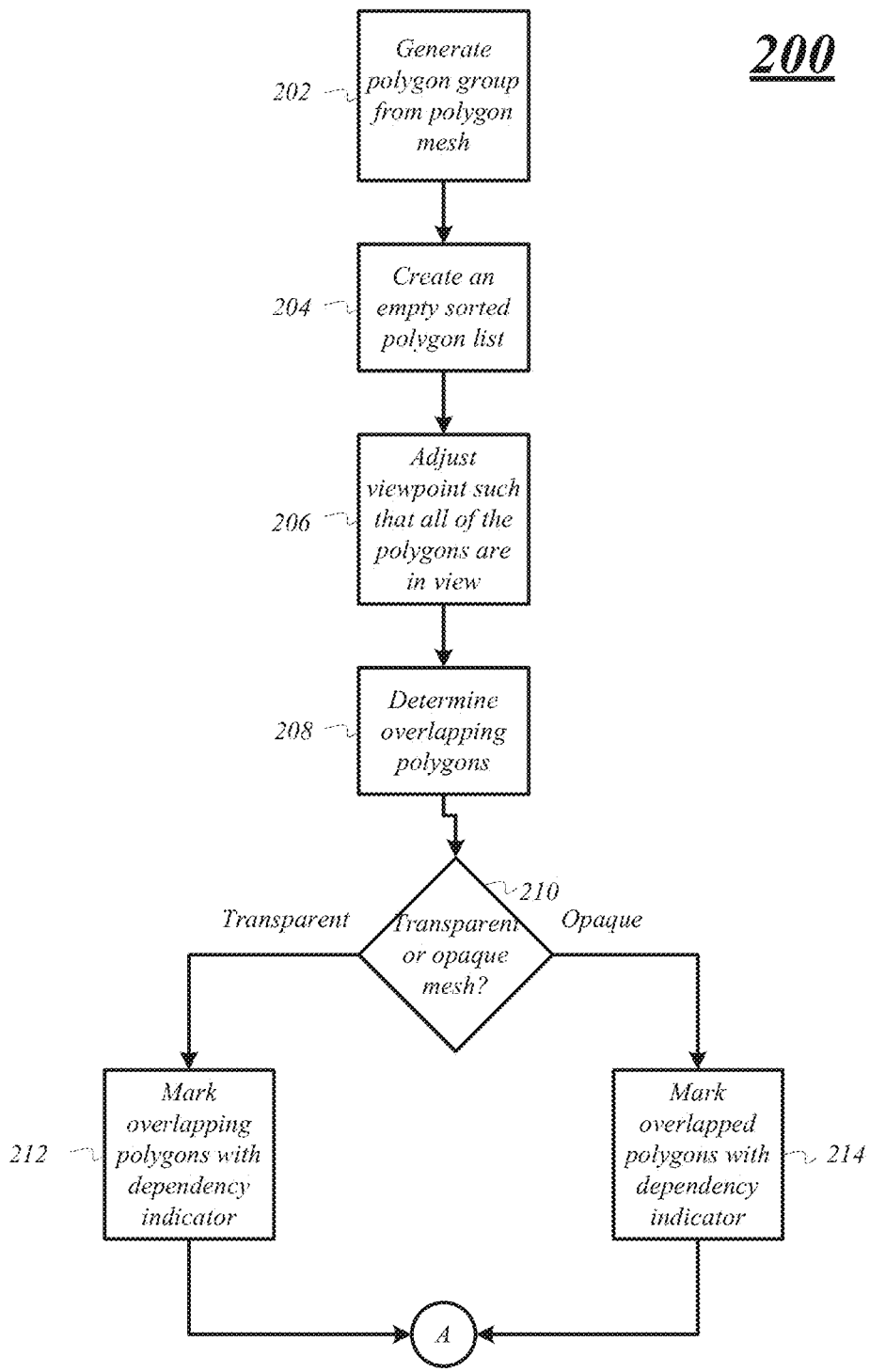
FIGS. 2A/2B illustrate embodiments of a first logic flow diagram.
Figure 2B:
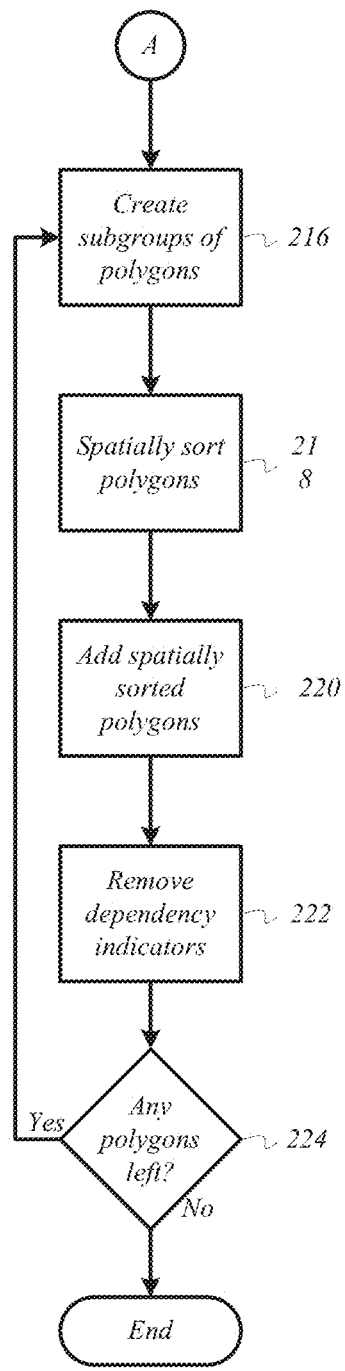

FIGS. 2A/2B illustrates an exemplary embodiment of first logic flow 200 for spatially sorting polygons for a scene. At block 202, a group of polygons is generated from one or more polygons creating one or more polygon meshes for a scene. The polygons may include graphics information including a collection of vertices, edges and faces that defines a shape of one or more objects or scene for computer graphics. The graphics information may also include information for color, hue and texture for the polygons. The polygons may include information from a vertex buffer and index buffer and view frustum information. At block 204, an empty sorted list is created to store sorted polygons. The sorted polygon list may be used to create a new index buffer to process the graphics information by the GPU 106.

In some embodiments, a viewpoint may be adjusted before spatially sorting is applied such that all of the polygons of the scene are in the view frustum at block 206. The viewpoint may be adjusted by moving along a forward axis such that all of the polygons are in view. At block 208, the polygons are analyzed to determine overlapping polygons. From the new viewpoint, a determination is made for one or more polygons from the group of polygons as to whether the one or more polygons overlap one or more other polygons in the group of polygons to determine overlapping information.

In various embodiments, one or more polygons may intersect one or more other polygons. For example, a portion of one polygon may go through a portion of another polygon in the scene. One example for a scene would be a knife cutting into another object such as a piece of paper or a box. One or more polygons intersecting one or more other polygons is a special case of overlapping and is handled different, as will be discussed in more detail below with respect to blocks 212, 214.

At decision block 210, a determination is made as to whether spatial sorting is to be applied to polygons for a transparent mesh or an opaque mesh. If the spatial sorting is for a transparent mesh, the polygons overlapping other polygons are marked or tagged with a dependency indicator at block 212. The dependency indicator is added to the polygon to indicate that the polygon has a dependent polygon associated with it. For the case where one or more polygons intersect one or more other polygons, the polygon with a vertex having the closest distance to the viewpoint is marked or tagged with a dependency indicator.

In various embodiments, if the spatial sorting is for polygons for an opaque mesh, the polygon being overlapped by another is marked or tagged with a dependency indicator at block 214. For the case where one or more polygons intersects one or more other polygons, the polygon having a vertex with the furthest distance from the viewpoint is marked or tagged with the dependency indicator at block 214.

In various embodiments, a non-dependent subgroup of polygons is created including all of the polygons that are not marked or tagged with a dependency indicator at block 216. In addition, a dependent subgroup of polygons is created including all the polygons with overlapping information or dependency indicators. The polygons without any dependency indicators may then be spatially sorted at block 218. The polygons may be spatially sorted based on a maximum distance between each of the polygons, as will be discussed in more detail with respect to FIG. 5A. In some embodiments, the polygons may be spatially sorted based a maximum relative distance between sections of the scene having polygons in the section, as will be discussed in more detail with respect to FIG. 5B. Various embodiments are not limited in in this manner and the polygons may be spatially sorted in any manner including left to right, and right to left. The polygons may be spatially sorted to avoid re-sorting when the frustum slightly changes.

At block 220, the spatially sorted polygons are added to the sorted list of polygons on a per polygon basis. If the spatially sorted polygons were spatially sorted in block 218 such that there is a maximum distance between consecutive polygons or based on a maximum distance between polygons in sections of the scene, the polygons may be added to the sorted list of polygons in the order they were spatially sorted in. However, if the non-dependent subgroup of polygons were spatially sorted in a right to left or left to right fashion in block 218, the polygons may be added to the sorted list of polygons in staggered order to ensure separation between consecutive polygons as the polygons as they are added to the sorted list. The polygons are removed from the non-dependent subgroup of polygons as they are added to the sorted list and until no polygons remain in the subgroup of polygons.

In various embodiments, the dependency indicators are removed from all the polygons in the dependent subgroup of polygons associated with the polygons added to the sorted list of polygons at block 222. Then at decision block 224 a determination is made as to whether any polygons remain that are not in the sorted list or group of polygons. For example, polygons that have or just had their dependency indicators removed are not in the sorted list of polygons.

At this point, blocks 216-224 are repeated for sorting polygons from the dependent subgroup of polygons without any dependency indicators until all of the polygons in the group of polygons are in the sorted list of polygons. In some embodiments, the process may repeat a number of times based on a polygon with a maximum number of overlapping polygons. For example, one polygon may be overlapped by or is overlapping 5 other polygons, and thus, the process will repeat 5 times to process and sort all the polygons. For example, in some embodiments, polygons in the dependent subgroup of polygons may have one or dependency indicators removed and no longer have any dependency indicators. These polygons may be separated from the polygons in the dependent subgroup of polygons having dependency indicators to create a new non-dependent subgroup of polygons. These polygons may be added to a new non-dependent subgroup of polygons, spatially sorted and then added or appended to the previously sorted polygons in the sorted group or list of polygons. The newly sorted polygons may be added to the sorted group of polygons in the order in which they were sorted or in a staggered order, as previously discussed.

Figure 3B:
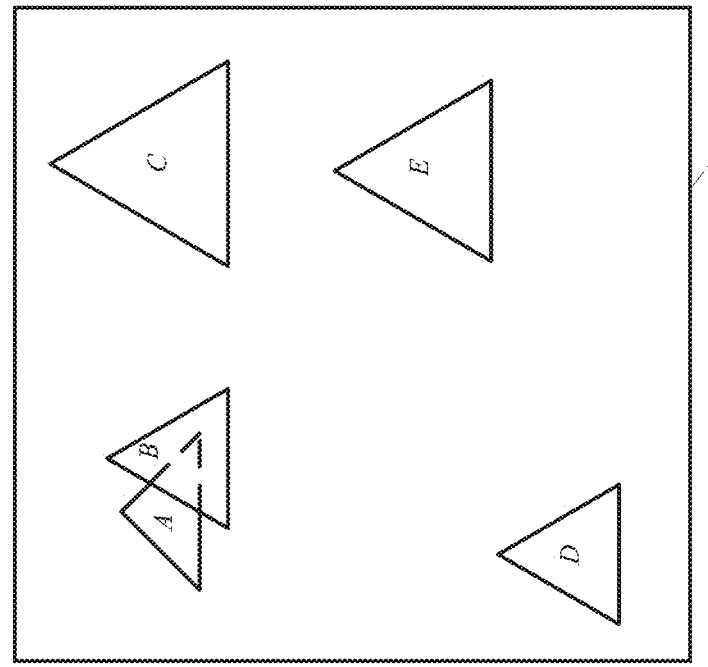
FIGS. 3A/3B illustrate embodiments of a 2-D view of polygons in a scene.
Figure 3A:
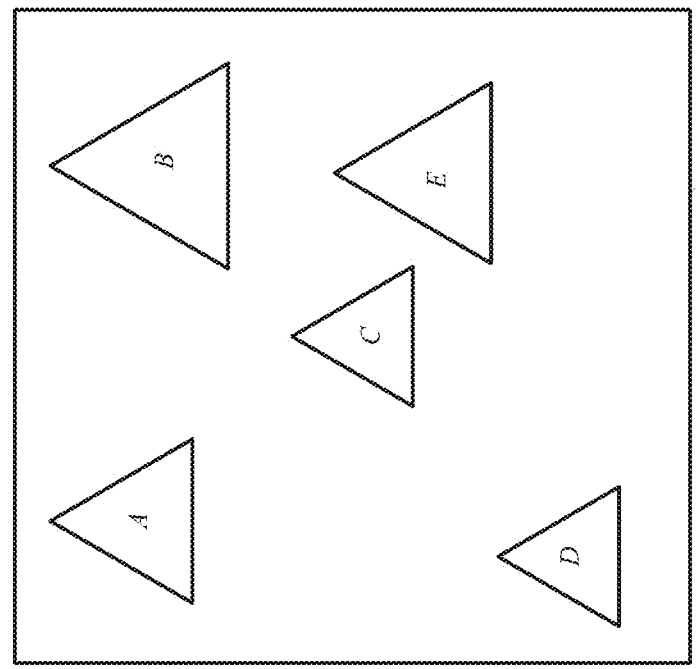

FIGS. 3A/3B illustrate embodiments of a plurality of polygons in a scene 305 on a display. The polygons may be spatially sorted as previously discussed above with respect to logic flow 200. For example, FIG. 3A illustrates a group of polygons without any overlapping. Therefore, no polygons are marked or tagged with a dependency indicator because there is no overlapping. All of the polygons, A, B, C, D and E may be put into the non-dependent subgroup of polygons. The polygons may be spatially sorted based on a maximum distance between each of the polygons. For example, the polygons can be sorted such that the new order of polygons for processing is A, E, B, D and C to ensure that the nearly overlapping polygons are not processed in consecutive order. The polygons may then be added to a sorted list of polygons for processing by a graphics processing unit (GPU). Since, in this example no polygons overlapped another polygon, no dependency indicators are removed and all of the polygons are in the sorted list of polygons. At this point, the polygons may be sent to the GPU for processing in an index buffer in the order in which they are in the sorted list.

FIG. 3B illustrates another scene with overlapping polygons. More specifically, polygon B overlaps polygon A. Therefore, in this case, polygon B is marked or tagged with a dependency indicator if spatial sorting is being applied for a transparent mesh or polygon A is marked or tagged with the dependency indicator if spatial sorting is being applied for an opaque mesh. The polygon marked or tagged with the dependency indicator will be separated into a dependent subgroup of polygons and the remaining polygons will be the non-dependent subgroup of polygons. The subgroup of non-dependent polygons on the first pass includes A, C, D and E, and B is marked or tagged with the dependency indicator for spatial sorting for a transparent mesh. If the mesh is an opaque mesh, the subgroup of non-dependent polygons on the first pass includes B, C, D and E and A is marked or tagged with a dependency indicator. The non-dependent subgroup of polygons is spatially sorted and/or put into the sorted list of polygons. The dependency indicator is then removed from the polygon(s) with the dependency indicators associated with polygons in the sorted group of polygons and a new subgroup of non-dependent polygons is created. In this case, either polygon A or polygon B is in the new subgroup of polygons based on whether the spatial sorting is for a transparent mesh or an opaque mesh. The new subgroup of non-dependent polygons may then be spatially sorted and/or added to the sorted list of polygons in a staggered order. In this example, only one polygon will be in the new subgroup of non-dependent polygons and is added to the sorted list of polygon, either polygon A or polygon B. Now all of the polygons are in the sorted list of polygons and they may be processed by the GPU. Various embodiments, are not limited to above example illustrating overlapping polygons, and any number of polygons may overlap any number of other polygons.

Figure 4:
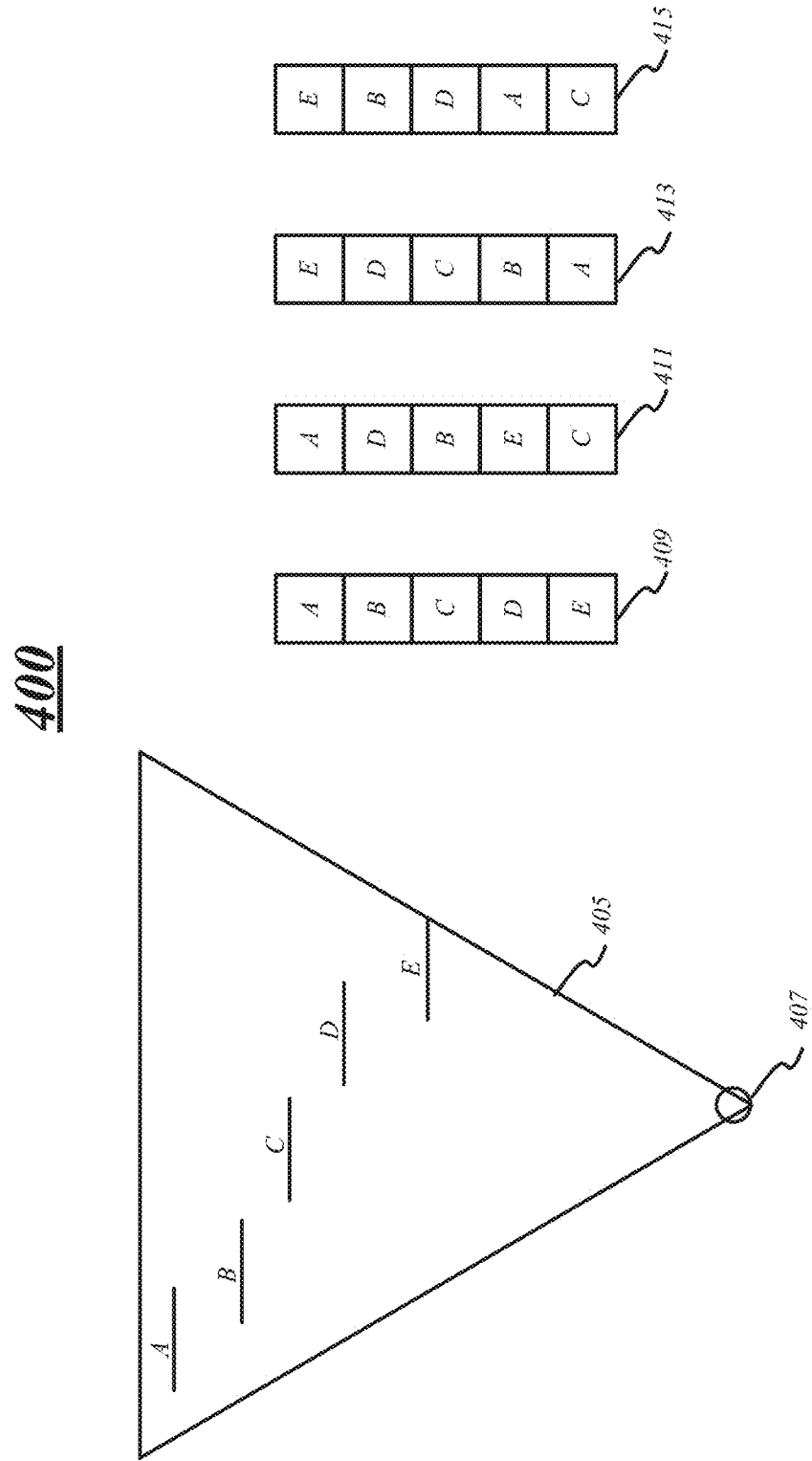
FIG. 4 illustrates an embodiment of a top down view of polygons in a scene.

FIG. 4 illustrates an exemplary embodiment of a top down view of polygons in scene 405 from a viewpoint 407. As shown in depth sorted list 409, the polygons are ordered A, B, C, D and E from back to front to render polygons with transparency correctly. However, as illustrated in FIG. 4, polygon B overlaps polygon A and polygon E overlaps polygons D from the viewpoint 407. Therefore, if the polygons are processed in a back to front order, overlapping polygons will be processed consecutively. Processing the polygons in this order may cause the GPU to stall while rendering the polygons because multiple hardware execution contexts may be simultaneously accessing graphics information associated with individual pixels. In this case, the application may experience a substantial performance penalty if these stalls occur.

In some embodiments, the polygons may be spatially sorted as shown in spatially sorted list 411 such that overlapping polygons or nearly overlapping polygons are not processed consecutively and stalls do not occur. As illustrated in spatially sorted list 411, the polygons are spatially sorted in the order of A, D, B, E, and C. The goal of the spatial sorting is to sort the graphics information in the same relative order as it was sorted before (back to front or front to back), but avoid rendering consecutive polygons at the same. In the exemplary embodiment illustrated in FIG. 4, the spatially sorted list 411 maintains a back to front order while spatially sorting the list such that overlapping or nearly overlapping are not processed consecutively.

In some embodiments, the polygons may be sorted from front to back to avoid overdraw when rendering an opaque. As shown depth sorted list 413, the polygons are sorted in the order of E, D, C, B and A for front to back order from the viewpoint 407. However, as similarly discussed above with the back to front order, polygon E overlaps polygon D and polygon B overlaps polygon A.

To avoid processing the overlapping polygons consecutively and to maintain the relative order of front to back, the polygons may be processed as shown in spatially sorted list 415. More specifically, the polygons may be processed in the following order, E, B, D, A and C to maintain a front to back order and avoid rendering stalls by processing overlapping polygons consecutively.

Figure 5B:
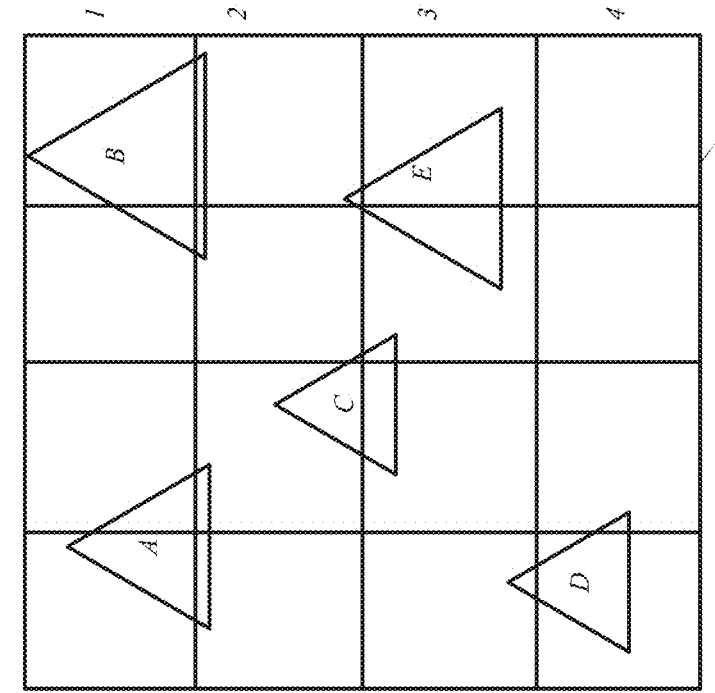
FIGS. 5A/5B illustrate embodiments of spatially sorting graphics information.
Figure 5A:
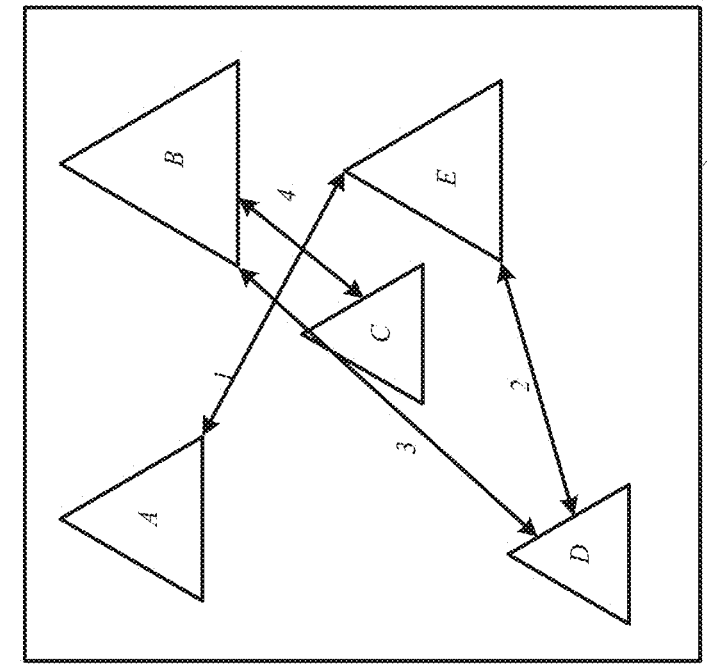

FIGS. 5A/5B illustrate exemplary embodiments of spatially sorting polygons such that overlapping or nearly overlapping are not processed or render consecutively. FIGS. 5A and 5B illustrate polygons in a two-dimensional (2-D) scene as would be shown on a display or display device. FIG. 5A shows an example of spatially sorting polygons based on a maximum distance between the polygons. The polygons may be spatially sorted in the order of A, E, D, B and C as illustrated by the numbered arrows. More specifically, polygon A is added to a spatially sorted list and then polygon E is added to the list because polygon E has a maximum relative distance from polygon A. Next polygon D is added to the sorted list because D has a maximum relative distance from polygon E. This technique is applied to all the polygons until all of the polygons are in the sorted list. In various embodiments, this technique is applied to the polygons in each of the subgroups of polygons as discussed above with respect to FIG. 2.

In some embodiments, the maximum distance between the polygons is determined using 2-D screen space or 3-D scene space projected onto a plane representing the 2-D screen. More specifically, the maximum distance is determined based on distances between the polygons as they are rendered on the 2-D display or screen, not the distance between the polygons in the 3-D space. For example, a scene with polygons that are separated by large z or depth distance in a 3-D space may have pixels render in 2-D space close to each other and/or nearly consecutively. Thus, the distance may be calculated based on how polygons are rendered on the 2-D screen space and not 3-D scene space.

In addition, the maximum distance may be determined between the edges of polygons including the end points of a vertex. A polygon may be made of vertices defining edges of the polygons. Each of the vertices may have end points that connect or couple with end points of other vertices to create the corners of the polygon. In some embodiments, the maximum distance between the polygons may be determined based on the closest coordinate of an edge of one polygon to the closest coordinate of an edge of another polygon. In some embodiments, the closet coordinate of an edge may be the end point of the vertex. However, various embodiments are not limited in this manner and the closest coordinate of an edge may be the middle of a vertex. The distance between each of the polygons may be determined in this manner. Further and as described above, the coordinates used to determine the maximum distance is based on the 2-D screen space locations of the polygons.

In some embodiments, the starting point to determine order of the sorted list of polygons is based on whether the relative order is supposed to be front to back (opaque meshes) or back to front (transparent meshes). If the relative order is supposed to be back to front, the furthest polygon (or deepest polygon) in the scene from the viewpoint is used as the starting point or reference polygon and next polygon added to the sorted list is the polygon with the maximum distance from the starting polygon. Next, the added polygon becomes the reference polygon and the next polygon added to the sorted list is the polygon with the maximum distance from the reference polygon. This is repeated until all of the polygons in the non-dependent subgroup of polygons are added to the sorted list of polygons. Moreover, if the relative order is supposed to be front to back, the closest polygon to the viewpoint is used as the starting polygon.

FIG. 5B illustrates another exemplary embodiment to determine the maximum relative distance between polygons based on the 2-D scene divided into sections or tiles. The maximum relative distance between each of the sections may be determined for each of the sections or tiles. The maximum distance between the sections or tiles may then be used to select the next polygon to add to the spatially sorted list. The determination may be made from the section or tile with the majority or substantial portion of the polygon if the polygon is in more than one of the tiles. For example, if polygon A is added to the sorted list first, polygon A is substantially in section 1, 1 and therefore section 1, 1 may be used to determine the next polygon to add to the sorted list based on another section or tile having a polygon in it or substantially in it. In the above, example, section 4, 4 is the section or tile with the maximum distance between the section or tile 1, 1. However, section 4, 4 does not have a polygon in it. Thus, the process may iterate over all the sections from the maximum distance section to the next maximum distance section until a section is found with a polygon in it. In this example, section 3, 3 has a polygon in it with the maximum distance to section 1, 1. Therefore, polygon E is added next to the spatially sorted list of polygons. Next, the section with the maximum distance between itself and section 3, 3 and having a polygon in it may be determined. In this case, the section is 1, 4 having polygon D substantially in it. Thus, polygon D is added next to the spatially sorted list of polygons. This process is repeated until all of the polygons are in the spatially sorted list. As previously discussed in FIG. 2, this process may be applied to the polygons in the subgroups of polygons. Various embodiments, are not limited to the above-recited examples for spatially sorting polygons on a display. Other methods or techniques may be applied to spatially sort the polygons while maintaining a relative order.

FIG. 6 illustrates one embodiment of a second logic flow 600. The logic flow 600 may be representative of some or all of the operations executed by one or more embodiments described herein. For example, the logic flow 600 may illustrate operations performed by the computing device 105 and system 700. More specifically, logic flow 600 may include assigning polygons of a group of polygons from a viewpoint of a scene into a dependent subgroup or a non-dependent subgroup based on dependency indicator at block 605. One or more polygons in the group of polygons may be identified with one or more dependency indicators based on overlapping information. In some embodiments, logic flow 600 may spatially sort polygons in the non-dependent subgroup to form a first partially sorted group of polygons at block 610. The polygons may be spatially sorted based on or more of spatial sorting techniques previously described such as, from left-to-right, right-to-left, sorting based on sections of a 2-D screen space, sorting based on a maximum distance between each of the polygons in the 2-D screen space, and/or sorting based on a maximum distance between polygons in sections of the 2-D screen space.

At block 615, polygons from the dependent subgroup of polygons may be spatially sorted to form a second partially sorted group of polygons. In various embodiments, only polygons without any dependency indicators in the dependent subgroup of polygons may be spatially sorted. As previously discussed, the dependency indicators may be removed from polygons in the dependent subgroup of polygons if the dependency indicator is associated with a polygon in the non-dependent subgroup of polygons in the sorted group of polygons. For example, a polygon in the non-dependent subgroup of polygons overlapped by another polygon and not having a dependency indicator may be added to the sorted list or group of polygons. The polygon in the dependent subgroup of polygons overlapping the polygon added to the group of polygons may have its dependency indicator removed. This will occur to all of the polygons in the dependent subgroup of polygons associated with polygons in the non-dependent subgroup of polygons and the sorted list or group of polygons.

In various embodiments, once the dependency indicators are removed, the polygons in the dependent subgroup of polygons no longer having dependency indicators may be spatially sorted. These polygons may be spatially sorted by creating a new non-dependent subgroup of polygons with the polygons without dependency indicators from the dependent subgroup of polygons and spatially sorting the new non-dependent subgroup of polygons.

In various embodiments, logic flow 600 may add polygons from the second group of polygons to the first group of polygons to form a complete sorted group of polygons at block 620. The polygons may be added in a the order in which they were spatially sorted or in a staggered order, as previously discussed above.

Figure 7:
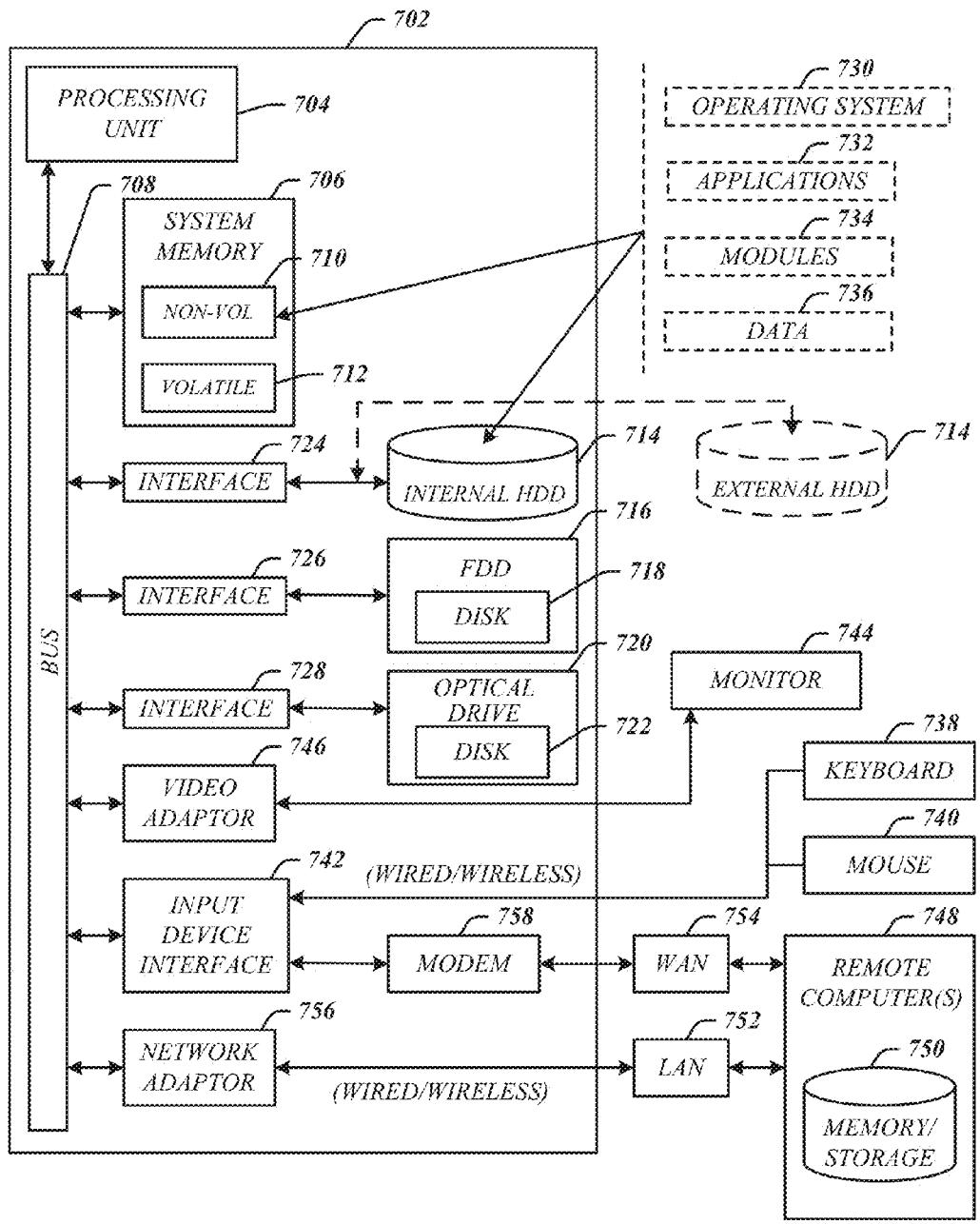
FIG. 7 illustrates an embodiment of a first computing architecture.

FIG. 7 illustrates an embodiment of an exemplary computing architecture 700 suitable for implementing various embodiments as previously described. In one embodiment, the computing architecture 700 may comprise or be implemented as part of computing device 105.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 702.11x (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the graphics processing pipeline 100, 200 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
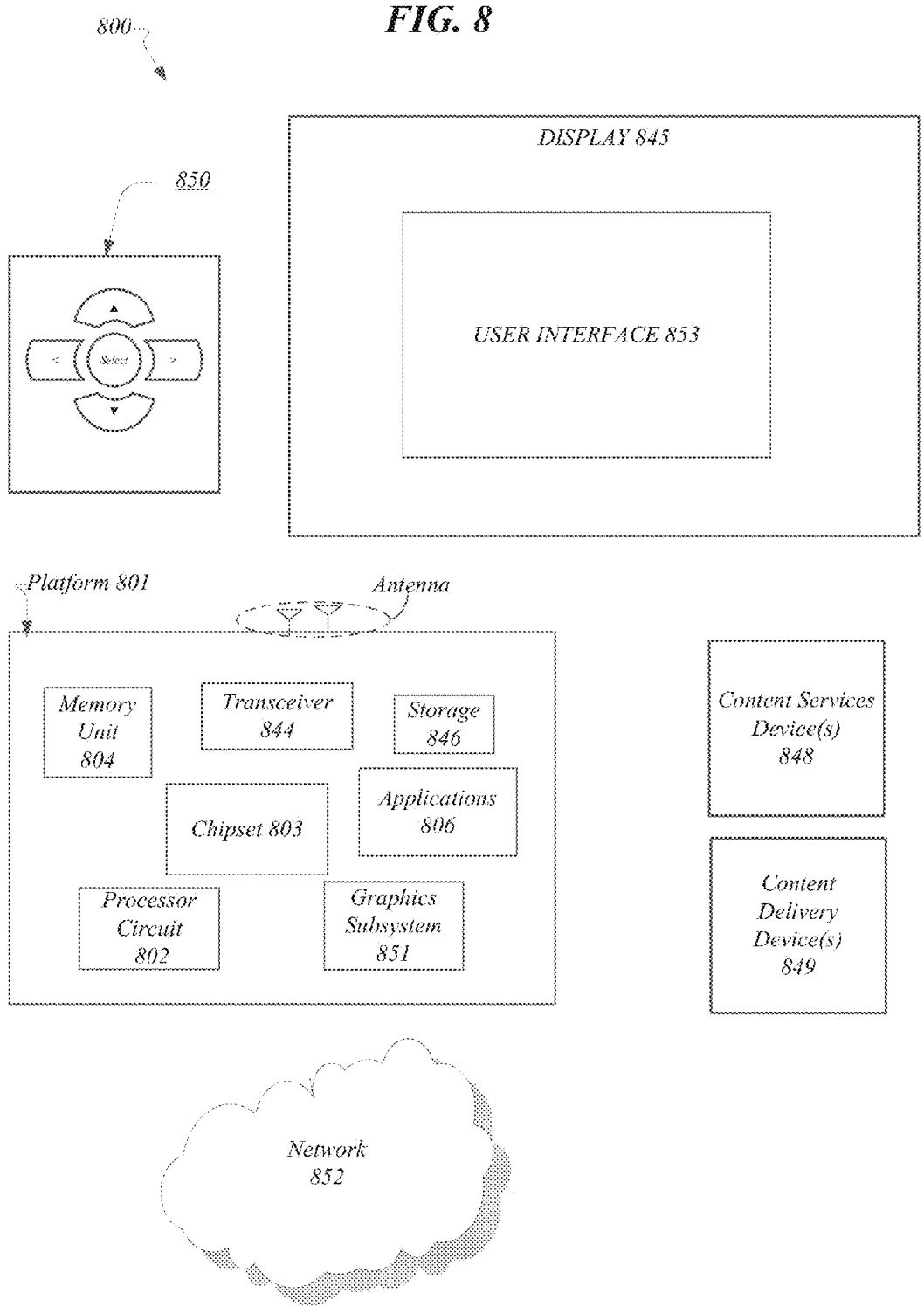
FIG. 8 illustrates an embodiment of a first computing system architecture.

FIG. 8 illustrates an embodiment of a system 800. In various embodiments, system 800 may be representative of a system or architecture suitable for use with one or more embodiments described herein, such as computing device 105 of FIG. 1, logic flow 200 of FIG. 2, and logic flow 600 of FIG. 6. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 includes a platform 801 coupled to a display 845. Platform 801 may receive content from a content device such as content services device(s) 848 or content delivery device(s) 849 or other similar content sources. A navigation controller 850 including one or more navigation features may be used to interact with, for example, platform 801 and/or display 845. Each of these components is described in more detail below.

In embodiments, platform 801 may include any combination of a processor circuit 802, chipset 803, memory unit 804, transceiver 844, storage 846, applications 806, and/or graphics subsystem 852. Chipset 803 may provide intercommunication among processor circuit 802, memory unit 804, transceiver 844, storage 846, applications 806, and/or graphics subsystem 852. For example, chipset 803 may include a storage adapter (not depicted) capable of providing intercommunication with storage 846.

Processor circuit 802 may be implemented using any processor or logic device, and may be the same as or similar to processor circuit 102 in FIG. 1.

Memory unit 804 may be implemented using any machine-readable or computer-readable media capable of storing data, and may be the same as or similar to memory unit 104 in FIG. 1.

Transceiver 844 may include one or more radios capable of transmitting and receiving signals using various suitable wireless communications techniques, and may be the same as or similar to transceiver 144 in FIG. 1.

Display 845 may include any television type monitor or display, and may be the same as or similar to display 145 in FIG. 1.

Storage 846 may be implemented as a non-volatile storage device, and may be the same as or similar to storage 146 in FIG. 1.

Graphics subsystem 852 may perform processing of images such as still or video for display. Graphics subsystem 852 may be a graphics processing unit (GPU) or a visual processing unit (VPU), and may the same or similar to the GPU 106 in FIG. 1. An analog or digital interface may be used to communicatively couple graphics subsystem 852 and display 845. For example, the interface may be any of a High-Definition Multimedia Interface, DisplayPort, wireless HDMI, and/or wireless HD compliant techniques.

Graphics subsystem 852 could be integrated into processor circuit 802 or chipset 803. Graphics subsystem 852 could be a stand-alone card communicatively coupled to chipset 803.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 848 may be hosted by any national, international and/or independent service and thus accessible to platform 801 via the Internet, for example. Content services device(s) 848 may be coupled to platform 801 and/or to display 845. Platform 801 and/or content services device(s) 848 may be coupled to a network 853 to communicate (e.g., send and/or receive) media information to and from network 853. Content delivery device(s) 849 also may be coupled to platform 801 and/or to display 845.

In embodiments, content services device(s) 848 may include a cable television box, personal computer, network, telephone, Internet enabled devices or appliance capable of delivering digital information and/or content, and any other similar device capable of unidirectionally or bidirectionally communicating content between content providers and platform 801 and/display 845, via network 853 or directly. It will be appreciated that the content may be communicated unidirectionally and/or bidirectionally to and from any one of the components in system 800 and a content provider via network 853. Examples of content may include any media information including, for example, video, music, medical and gaming information, and so forth.

Content services device(s) 848 receives content such as cable television programming including media information, digital information, and/or other content. Examples of content providers may include any cable or satellite television or radio or Internet content providers. The provided examples are not meant to limit embodiments of the invention.

In embodiments, platform 801 may receive control signals from navigation controller 850 having one or more navigation features. The navigation features of navigation controller 1150 may be used to interact with a user interface 854, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be echoed on a display (e.g., display 845) by movements of a pointer, cursor, focus ring, or other visual indicators displayed on the display. For example, under the control of software applications 806, the navigation features located on navigation controller 850 may be mapped to virtual navigation features displayed on user interface 854. In embodiments, navigation controller 850 may not be a separate component but integrated into platform 801 and/or display 845. Embodiments, however, are not limited to the elements or in the context shown or described herein.

In embodiments, drivers (not shown) may include technology to enable users to instantly turn on and off platform 801 like a television with the touch of a button after initial boot-up, when enabled, for example. Program logic may allow platform 801 to stream content to media adaptors or other content services device(s) 848 or content delivery device(s) 849 when the platform is turned "off." In addition, chip set 803 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 800 may be integrated. For example, platform 801 and content services device(s) 848 may be integrated, or platform 801 and content delivery device(s) 849 may be integrated, or platform 801, content services device(s) 848, and content delivery device(s) 849 may be integrated, for example. In various embodiments, platform 801 and display 845 may be an integrated unit. Display 845 and content service device(s) 848 may be integrated, or display 845 and content delivery device(s) 849 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 801 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
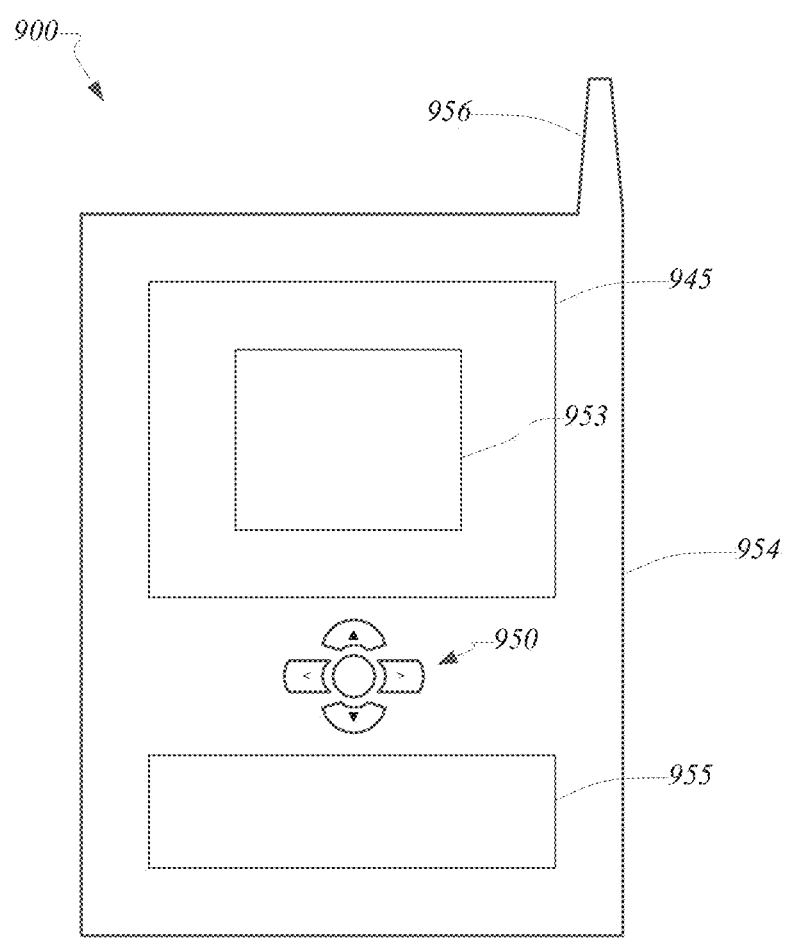
FIG. 9 illustrates an embodiment of a second computing system.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a display 945, a navigation controller 950, a user interface 954, a housing 955, an I/O device 956, and an antenna 857. Display 945 may include any suitable display unit for displaying information appropriate for a mobile computing device, and may be the same as or similar to display 845 in FIG. 8. Navigation controller 950 may include one or more navigation features which may be used to interact with user interface 954, and may be the same as or similar to navigation controller 850 in FIG. 8. I/O device 956 may include any suitable I/O device for entering information into a mobile computing device. Examples for I/O device 956 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

The detailed disclosure now turns to providing examples that pertain to further embodiments. Examples one through thirty-seven (1-37) provided below are intended to be exemplary and non-limiting.

In a first example, an computing device or apparatus may comprise a processing circuit to process graphics-related scenes and a spatial sorting module for execution by the processing circuit to separate a group of polygons from a viewpoint of a scene into a dependent subgroup of polygons or a non-dependent subgroup of polygons, and spatially sort the non-dependent subgroup of polygons and the dependent group of polygons separately to form a sorted group of polygons.

In a second example and in furtherance of the previous examples, the computing device or the apparatus may comprise the spatial sorting module to determine whether one or more polygons overlap one or more other polygons in the group of polygons.

In a third example and in furtherance of the previous examples, the computing device or the apparatus may comprise the spatial sorting module to assign a dependency indicator to each polygon that overlaps another polygon when sorting for transparent polygons.

In a fourth example and in furtherance of the previous examples, the computing device or the apparatus may comprise the spatial sorting module to assign a dependency indicator to each polygon that is overlapped by another polygon when sorting for opaque polygons.

In a fifth example and in furtherance of the previous examples, the computing device or the apparatus may comprise the spatial sorting module to assign polygons that do not have a dependency indicator into the non-dependent subgroup of polygons, and polygons that do have a dependency indicator into the dependent subgroup of polygons.

In a sixth example and in furtherance of the previous examples, the computing device or the apparatus may comprise the spatial sorting module to sort the non-dependent subgroup of polygons and dependent subgroup of polygons based on a maximum relative distance between each of the polygons in a 2-Dimensional (2-D) screen space prior to adding the polygons into the sorted group of polygons.

In a seventh example and in furtherance of the previous examples, the computing device or the apparatus may comprise the spatial sorting module to sort the non-dependent subgroup of polygons and dependent subgroup of polygons based on a maximum relative distance between sections of a 2-Dimensional (2-D) screen space having polygons prior to adding the polygons into the sorted group of polygons.

In an eighth example and in furtherance of the previous examples, the computing device or the apparatus may comprise the spatial sorting module to remove a dependency indicator from polygons in the dependent subgroup of polygons associated with polygons spatially sorted in the non-dependent subgroup of polygons, spatially sort polygons without dependency indicators in the dependent subgroup polygons, and append the sorted polygons from the dependent subgroup of polygons to the sorted group of polygons.

In a ninth example and in furtherance of the previous examples, the computing device or the apparatus may comprise the spatial sorting module to determine whether a polygon intersects one or more polygons, determine which of the intersecting polygons has a vertex with a closest distance to the viewpoint for transparent polygons, and identify the polygon with the vertex with the closest distance with the dependency indicator.

In a tenth example and in furtherance of the previous examples, the computing device or the apparatus may comprise the spatial sorting module to determine whether a polygon intersects one or more polygons, determine which of the intersecting polygons has a vertex with a furthest distance to the viewpoint for opaque polygons, and identify the polygon with the vertex with the furthest distance with the dependency indicator.

In a eleventh example and in furtherance of the previous examples, the apparatus may comprise the spatial sorting module to adjust the viewpoint such that all the polygons for the scene are in the group of polygons.

In a twelfth example and in furtherance of the previous examples, the computing device or the apparatus may comprise the spatial sorting module to spatially sort the non-dependent subgroup of polygons and dependent subgroup of polygons in a left to right order or a right to left order in a 2-Dimensional (2-D) screen space, and add each polygon from the non-dependent subgroup of polygons and the dependent subgroup of polygons in a staggered order to the sorted group of polygons.

In a thirteenth example and in furtherance of the previous examples, the computing device or the apparatus may comprise the spatial sorting module to add each polygon from the non-dependent subgroup of polygons and the dependent subgroup of polygons in the staggered order based on a furthest distance between polygons in the non-dependent subgroup of polygons or dependent subgroup of polygons not in the sorted group of polygons.

In a fourteenth example and in furtherance of the previous examples, the computing device or the apparatus may comprise the spatial sorting module to add each polygon from the non-dependent subgroup of polygons and the dependent subgroup of polygons in the staggered order based on polygons in one or more sections of the 2-D screen space for the non-dependent subgroup of polygons or dependent subgroup of polygons not in the sorted group of polygons.

In a fifteenth example and in furtherance of the previous examples, a computer-implemented may comprise assigning polygons of a group of polygons from a viewpoint of a scene into a dependent subgroup or a non-dependent subgroup based on dependency indicator, spatially sorting polygons in the non-dependent subgroup to form a first partially sorted group of polygons, spatially sorting polygons in the dependent subgroup to form a second partially sorted group of polygons and adding polygons from the second group of polygons to the first group of polygons to form a complete sorted group of polygons.

In a sixteenth example and in furtherance of the previous examples, a computer-implemented method may comprise determining whether one or more polygons overlap one or more other polygons in the group of polygons.

In a seventeenth example and in furtherance of the previous examples, a computer-implemented method may comprise assigning a dependency indicator to each polygon that overlaps another polygon when sorting for transparent polygons.

In a eighteenth example and in furtherance of the previous examples, a computer-implemented method may comprise assigning a dependency indicator to each polygon that is overlapped by another polygon when sorting for opaque polygons.

In a nineteenth example and in furtherance of the previous example, a computer-implemented method may comprise assigning polygons that do not have a dependency indicator into the non-dependent subgroup of polygons, and polygons that do have a dependency indicator into the dependent subgroup of polygons.

In a twentieth example and in furtherance of the previous examples, a computer-implemented method may comprise removing a dependency indicator from polygons in the dependent subgroup of polygons associated with polygons spatially sorted in the non-dependent subgroup of polygons, spatially sorting polygons without dependency indicators in the dependent subgroup polygons and adding the sorted polygons from the dependent subgroup of polygons to the sorted group of polygons.

In a twenty-first example and in furtherance of the previous examples, An article comprising the computer-readable storage medium containing the plurality of instructions that when executed enable the computing device to assign polygons of a group of polygons from a viewpoint of a scene into a dependent subgroup or a non-dependent subgroup based on dependency indicators, spatially sort polygons in the non-dependent subgroup to form a first partially sorted group of polygons, spatially sort polygons from the dependent subgroup to form a second partially sorted group of polygons and add polygons from the second group of polygons to the first group of polygons to form a complete sorted group of polygons.

In a twenty-second example and in furtherance of the previous examples, a computer-readable storage medium containing a plurality of instructions that when executed enable a computing device to determine whether one or more polygons overlap one or more other polygons in the group of polygons.

In a twenty-third example and in furtherance of the previous examples, the computer-readable storage medium containing the plurality of instructions that when executed enable the computing device to assign a dependency indicator to each polygon that overlaps another polygon when sorting for transparent polygons.

In a twenty-fourth example and in furtherance of the previous examples, the computer-readable storage medium containing the plurality of instructions that when executed enable the computing device to assign a dependency indicator to each polygon that is overlapped by another polygon when sorting for opaque polygons.

In a twenty-fifth example and in furtherance of the previous examples, the computer-readable storage medium containing the plurality of instructions that when executed enable the computing device to assign polygons that do not have a dependency indicator into the non-dependent subgroup of polygons, and polygons that do have a dependency indicator into the dependent subgroup of polygons.

In a twenty-sixth example and in furtherance of the previous examples, comprising means for An apparatus, comprising means for processing graphics-related scenes, means for separating a group of polygons from a viewpoint of a scene into a dependent subgroup of polygons or a non-dependent subgroup of polygons and means for spatially sorting the non-dependent subgroup of polygons and the dependent group of polygons separately to form a sorted group of polygons.

In a twenty-seventh example and in furtherance of the previous examples, comprising means for determining whether one or more polygons overlap one or more other polygons in the group of polygons.

In a twenty-eighth example and in furtherance of the previous examples, comprising means for assigning a dependency indicator to each polygon that overlaps another polygon when sorting for transparent polygons.

In a twenty-ninth example and in furtherance of the previous examples, comprising means for assigning a dependency indicator to each polygon that is overlapped by another polygon when sorting for opaque polygons.

In a thirtieth example and in furtherance of the previous examples, comprising means for assigning polygons that do not have a dependency indicator into the non-dependent subgroup of polygons, and polygons that do have a dependency indicator into the dependent subgroup of polygons.

In a thirty-first example and in furtherance of the previous examples, comprising means for sorting the non-dependent subgroup of polygons and dependent subgroup of polygons based on a maximum relative distance between each of the polygons in a 2-Dimensional (2-D) screen space.

In a thirty-second example and in furtherance of the previous examples, comprising means for sorting the non-dependent subgroup of polygons and dependent subgroup of polygons based on a maximum relative distance between sections of a 2-Dimensional (2-D) screen space having polygons.

In a thirty-third example and in furtherance of the previous examples, comprising means for means for removing a dependency indicator from polygons in the dependent subgroup of polygons associated with polygons spatially sorted in the non-dependent subgroup of polygons, means for spatially sorting polygons without dependency indicators in the dependent subgroup polygons and means for appending the sorted polygons from the dependent subgroup of polygons to the sorted group of polygons.

In a thirty-fourth example and in furtherance of the previous examples, comprising means for determining whether a polygon intersects one or more polygons, means for determining which of the intersecting polygons has a vertex with a closest distance to the viewpoint for transparent polygons and means for identifying the polygon with the vertex with the closest distance with the dependency indicator.

In a thirty-fifth example and in furtherance of the previous examples, comprising means for determining whether a polygon intersects one or more polygons, means for determining which of the intersecting polygons has a vertex with a furthest distance to the viewpoint for opaque polygons and means for identifying the polygon with the vertex with the furthest distance with the dependency indicator.

In a thirty-sixth example and in furtherance of the previous examples, comprising means for adjusting the viewpoint such that all the polygons for the scene are in the group of polygons.

In a thirty-seventh example and in furtherance of the previous examples, comprising means for spatially sorting the non-dependent subgroup of polygons and dependent subgroup of polygons in a left to right order or a right to left order in a 2-Dimensional (2-D) screen space, and means for adding each polygon from the non-dependent subgroup of polygons and dependent subgroup of polygons in a staggered order to the sorted group of polygons.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

APPENDIX

Below is one embodiment of source code that may be used for generating spatially sorted polygon lists as described in various embodiments. The embodiments are not limited to the following source code that is provided for purposes of illustration and not limitation.
PolygonList spatialSortedPolygonList;

```
PolygonList currentPolygonList = GeneratePolygonList( vertexBuffer,
indexBuffer);
MatrixviewMatrix = AdjustviewMatrix AdjustviewMatrix (
currentViewMatrix, fov, vertexBuffer, indexBuffer);
For (Polygon a = currentPolygonList.Start( ) ; a !=
currentPolygonList.End( ); a= a.Next( ))
{
    For (Polygon b = currentPolygonList.Start( ) ;
    b != currentPolygonList.End( ); b =
    b.Next( ))
    {
        If (( a != b) and CheckObstruction (viewMatrix, a, b))
        {
            a->IsDependantOn (b);
        }
    }
}
While (currentPolygonList.IsNotEmpty ( ))
{
    PolygonList zeroDependencyList = GetNoDependency Polygons(
currentPolygonList );
    Spatialresort( zeroDependencyList );
    spatialSortedPolygonList.Append( zeroDependencyList );
    currentPolygonList.RemoveDependencies( zeroDependencyList );}
```

The invention claimed is:

1. An apparatus, comprising:
   processing circuitry; and
   a spatial sorting module for execution by the processing circuitry to:
      separate a group of polygons from a viewpoint of a scene into a dependent subgroup of polygons based on whether a polygon either overlaps other polygons or is overlapped by other polygons, or a non-dependent subgroup of polygons, and
      spatially sort the non-dependent subgroup of polygons and the dependent group of polygons separately to form a sorted group of polygons based on a maximum relative distance between each of the polygons in a 2-Dimensional (2-D) screen space.

2. The apparatus of claim 1, wherein execution of the spatial sorting module by the processing circuitry further comprises determining whether one or more polygons overlap one or more other polygons in the group of polygons.

3. The apparatus of claim 1, wherein execution of the spatial sorting module by the processing circuitry further comprises assigning a dependency indicator to each polygon that overlaps another polygon when sorting for transparent polygons.

4. The apparatus of claim 1, wherein execution of the spatial sorting module by the processing circuitry further comprises assigning a dependency indicator to each polygon that is overlapped by another polygon when sorting for opaque polygons.

5. The apparatus of claim 1, wherein execution of the spatial sorting module by the processing circuitry further comprises assigning polygons that do not have a dependency indicator into the non-dependent subgroup of polygons, and polygons that do have a dependency indicator into the dependent subgroup of polygons.

6. The apparatus of claim 1, wherein execution of the spatial sorting module by the processing circuitry further comprises sorting the non-dependent subgroup of polygons and dependent subgroup of polygons based on a maximum relative distance between sections of a 2-Dimensional (2-D) screen space having polygons.

7. The apparatus of claim 1, wherein execution of the spatial sorting module by the processing circuitry further comprises removing a dependency indicator from polygons in the dependent subgroup of polygons associated with polygons spatially sorted in the non-dependent subgroup of polygons, spatially sorting polygons without dependency indicators in the dependent subgroup polygons, and appending the sorted polygons from the dependent subgroup of polygons to the sorted group of polygons.

8. The apparatus of claim 1, wherein execution of the spatial sorting module by the processing circuitry further comprises determining whether a polygon intersects one or more polygons, determining which of the intersecting polygons has a vertex with a closest distance to the viewpoint for transparent polygons, and identifying the polygon with the vertex with the closest distance with the dependency indicator.

9. The apparatus of claim 1, wherein execution of the spatial sorting module by the processing circuitry further comprises determining whether a polygon intersects one or more polygons, determining which of the intersecting polygons has a vertex with a furthest distance to the viewpoint for opaque polygons, and identifying the polygon with the vertex with the furthest distance with the dependency indicator.

10. The apparatus of claim 1, wherein execution of the spatial sorting module by the processing circuitry further comprises adjusting the viewpoint such that all the polygons for the scene are in the group of polygons.

11. The apparatus of claim 1, wherein execution of the spatial sorting module by the processing circuitry further comprises spatially sorting the non-dependent subgroup of polygons and dependent subgroup of polygons in a left to right order or a fight to left order in a 2-Dimensional (2-D) screen space, and adding each polygon from the non-dependent subgroup of polygons or dependent subgroup of polygons in a staggered order to the sorted group of polygons.

12. The apparatus of claim 11, wherein the staggered order is based on a furthest distance between polygons in the non-dependent subgroup of polygons or dependent subgroup of polygons not in the sorted group of polygons.

13. The apparatus of claim 11, wherein the staggered order is based on polygons in one or more sections of the 2-D screen space for the non-dependent subgroup of polygons or dependent subgroup of polygons not in the sorted group of polygons.

14. A computer-implemented method, comprising:
assigning polygons of a group of polygons from a viewpoint of a scene into a dependent subgroup or a non-dependent subgroup based on a dependency indicator, wherein the dependency indicator is based on whether a polygon either overlaps other polygons or is overlapped by other polygons;
spatially sorting polygons in the non-dependent subgroup to form a first partially sorted group of polygons;
spatially sorting polygons in the dependent subgroup to form a second partially sorted group of polygons; and
adding polygons from the second group of polygons to the first group of polygons to form a complete sorted group of polygons.

15. The computer-implemented method of claim 14, comprising:
determining whether one or more polygons overlap one or more other polygons in the group of polygons.

16. The computer-implemented method of claim 14, comprising:
assigning a dependency indicator to each polygon that overlaps another polygon when sorting for transparent polygons.

17. The computer-implemented method of claim 14, comprising:
assigning a dependency indicator to each polygon that is overlapped by another polygon when sorting for opaque polygons.

18. The computer-implemented method of claim 14, comprising:
assigning polygons that do not have a dependency indicator into the non-dependent subgroup of polygons, and polygons that do have a dependency indicator into the dependent subgroup of polygons.

19. The computer-implemented method of claim 14, comprising:
removing a dependency indicator from polygons in the dependent subgroup of polygons associated with polygons spatially sorted in the non-dependent subgroup of polygons,
spatially sorting polygons without dependency indicators in the dependent subgroup polygons; and
adding the sorted polygons from the dependent subgroup of polygons to the sorted group of polygons.

20. An article comprising a non-transitory computer-readable storage medium containing a plurality of instructions that when executed enable a computing device to:
assign polygons of a group of polygons from a viewpoint of a scene into a dependent subgroup or a non-dependent subgroup based on a dependency indicator, wherein the dependency indicator is based on whether a polygon either overlaps other polygons or is overlapped by other polygons;
spatially sort polygons in the non-dependent subgroup to form a first partially sorted group of polygons;
spatially sort polygons in the dependent subgroup to form a second partially sorted group of polygons; and
add polygons from the second group of polygons to the first group of polygons to form a complete sorted group of polygons.

21. The article of claim 20, comprising the non-transitory computer-readable storage medium containing the plurality of instructions that when executed enable the computing device to:
determine whether one or more polygons overlap one or more other polygons in the group of polygons.

22. The article of claim 20, comprising the non-transitory computer-readable storage medium containing the plurality of instructions that when executed enable the computing device to:

assign a dependency indicator to each polygon that overlaps another polygon when sorting for transparent polygons.

23. The article of claim 20, comprising the non-transitory computer-readable storage medium containing the plurality of instructions that when executed enable the computing device to:
assign a dependency indicator to each polygon that is overlapped by another polygon when sorting for opaque polygons.

24. The article of claim 20, comprising the non-transitory computer-readable storage medium containing the plurality of instructions that when executed enable the computing device to:
assign polygons that do not have a dependency indicator into the non-dependent subgroup of polygons, and polygons that do have a dependency indicator into the dependent subgroup of polygons.

* * * * *